G. W. HIGGINS & J. UNGAR.
GLASS CUTTER'S BOARD.
APPLICATION FILED FEB. 10, 1913.

1,100,878.

Patented June 23, 1914.

2 SHEETS—SHEET 1.

Witnesses:
F. Griswold.
E. Worthington.

Inventors,
George W. Higgins & Joseph Ungar,
by L. G. Hopper,
Attorney.

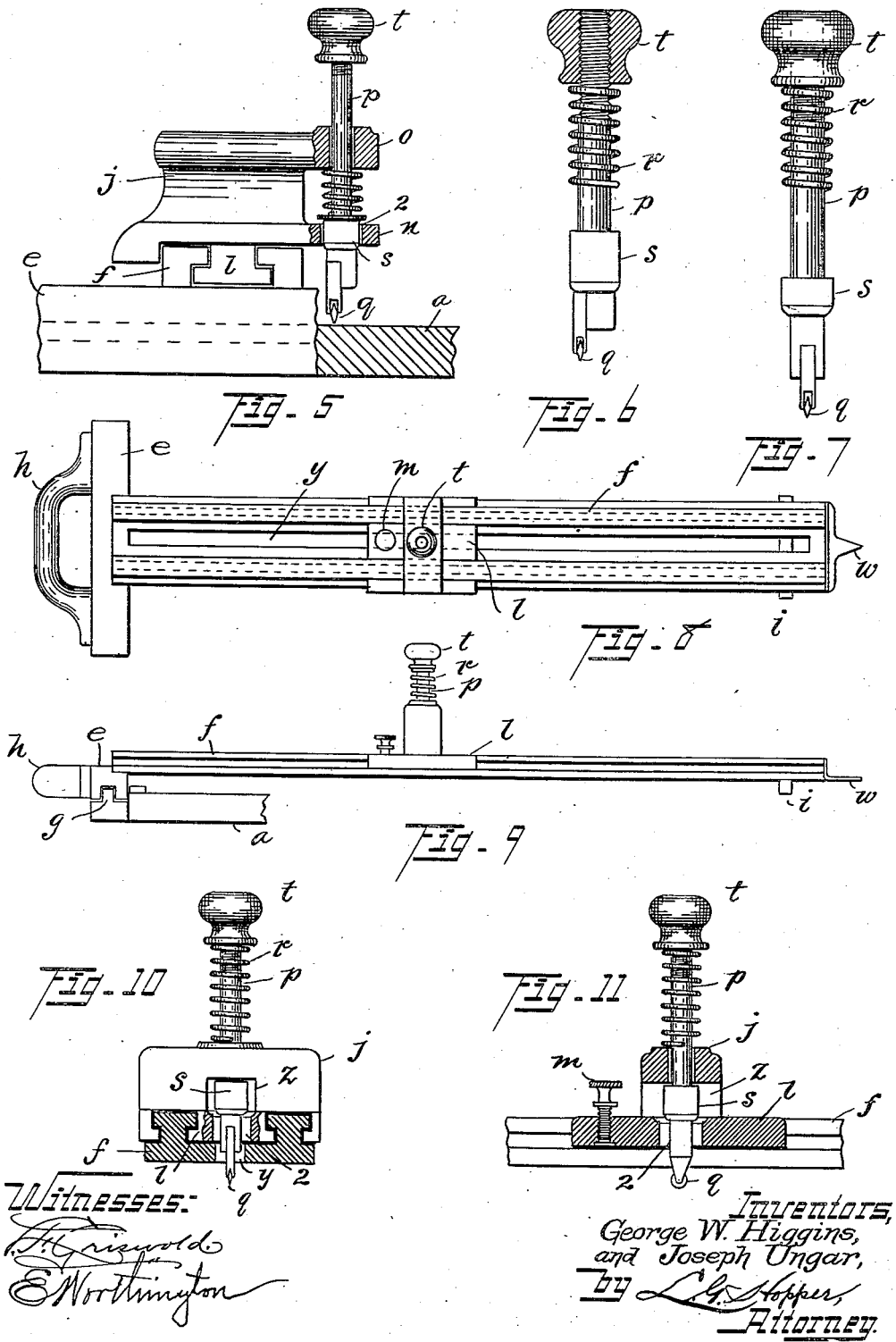

UNITED STATES PATENT OFFICE.

GEORGE W. HIGGINS AND JOSEPH UNGAR, OF CLEVELAND, OHIO.

GLASS-CUTTER'S BOARD.

1,100,878.   Specification of Letters Patent.   Patented June 23, 1914.

Application filed February 10, 1913.   Serial No. 747,232.

*To all whom it may concern:*

Be it known that we, GEORGE W. HIGGINS and JOSEPH UNGAR, citizens of the United States, residing at Cleveland, in the county of Cuyahoga and State of Ohio, have invented new and useful Improvements in Glass-Cutters' Boards, of which the following is a specification.

This invention relates to apparatus for facilitating the accurate cutting of plates or sheets of glass.

It requires care and skill to cut sheet glass with an ordinary cutter held in the hand and bearing against a straight-edge, which latter is very difficult to set and hold in place.

The purpose of our present invention, therefore, is to provide means whereby panes of glass may be readily, accurately and expeditiously cut to size by any one, even though he be a mere tyro in the art.

Figure 1:
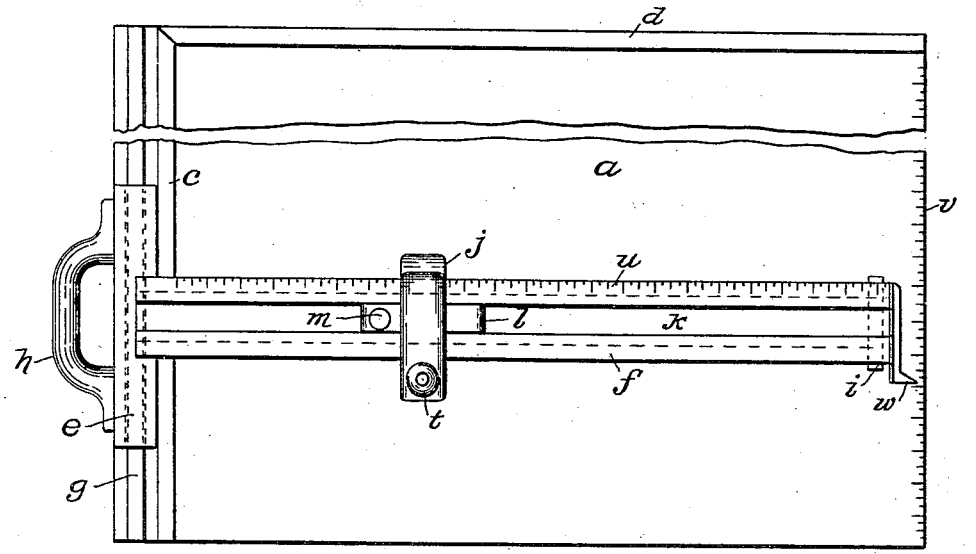
Figure 2:
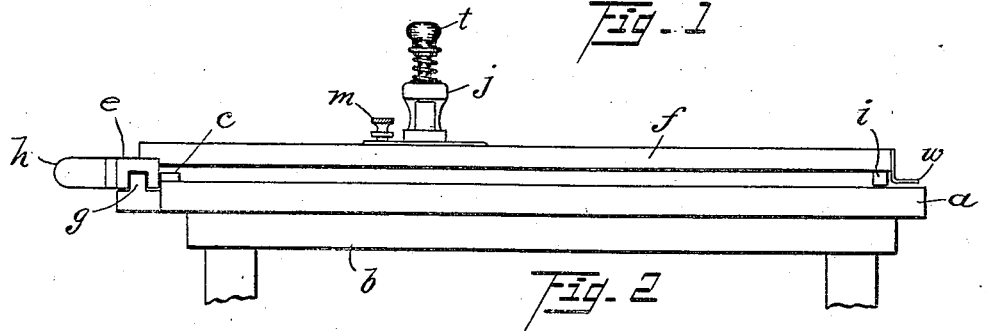
Figure 3:
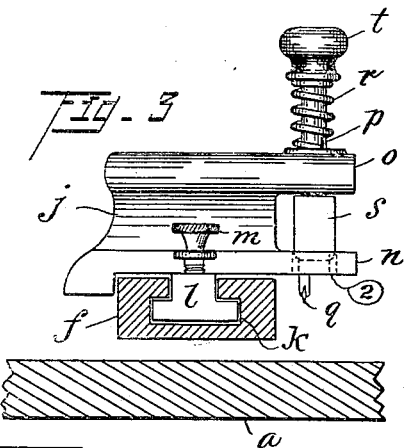
Figure 4:
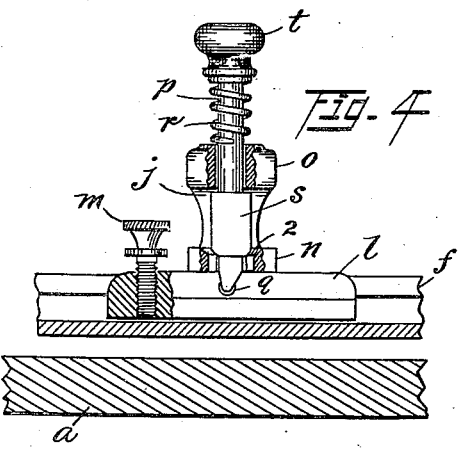

Referring now to the accompanying drawings wherein embodiments of our invention are illustrated Figure 1 is a plan view, and Fig. 2 is an end elevation of the apparatus. Fig. 3 is a detailed side view, and Fig. 4 an end view, partly in section, of the cutter-head, and its appurtenances. Fig. 5 is a side view, partly in section, showing the arrangement for holding the cutter normally against the glass. Figs. 6 and 7 are detailed elevations of cutter handles. Fig. 8 is a plan view, and Fig. 9 is a side elevation of a modified form of the movable parts of the apparatus. Fig. 10 is a detailed cross section, and Fig. 11 a longitudinal section in detail of Figs. 8 and 9.

The reference letter *a* indicates a plane, smooth board of wood, or other suitable material, which may be supported upon a table *b*, Fig. 2, or in any convenient way. The plate of glass to be cut is laid upon the board *a* with its edges abutting against the stops *c* and *d*, which latter are, preferably, strips raised above and secured respectively along the front side and one end of the board. Rigidly secured to the board *a* along its front edge is a guide rail *g*, which may be a strip of wood or metal, but a raised rectangular rib, as shown, is preferred. A movable guide arrangement, adapted to slide lengthwise of the board *a*, comprises a head-piece *e* grooved underneath to a sliding fit upon the guide *g*, a straight-edged blade portion *f* secured at right angles to the head *e* so as to project across the board, and a handle *h*. A runner *i* is secured to the under side of the blade *f* near its outer end to keep it level.

A groove *k* is formed throughout the length of the blade *f*, and rabbeted out on both sides to receive and slidably retain the slipper *l* of a cutter-head *j*, which latter projects above and crosswise of the blade *f*, and has a bulging top suitably shaped for convenience in grasping it and holding it with the hand, as plainly shown in Figs. 1 to 5. Means, such as the clamping screw *m*, are provided for locking the cutter-head to the blade, whenever it may be desired to do so.

Two lugs, or brackets, one above the other, project laterally from the cutter-head and overhang the blade *f*, the upper lug *o* having a round hole drilled vertically through it, and the lower lug *n* having a square aperture 2 therethrough alined with the upper hole. The round shank of a cutter handle *p* is fitted to slide through the hole in *o*, and an abruptly shouldered, enlarged and squared portion *s* of said cutter handle is formed to a sliding fit in the aperture 2 of *n*, and has its lower edges chamfered off, as shown, to facilitate its entering the hole 2.

A glass cutter *q*, which may be either a diamond or hardened steel, is fixedly secured to the lower end of the handle *p* so as to project below the lug *n*. A light spiral spring *r* is slipped over the round shank of *p*, and rests normally on the lug *o*. A knob *t* is screw threaded on the upper end of *p*, and provided with a shoulder underneath, whereby the tension of the spring *r* may be adjusted. One edge of the blade *f* is graduated, as shown at *u*, to units and fractions of linear measurement to be read at one side of the cutter-head *j*, and indicating the distance of the cutter *q* from the stop strip *c*. Similar graduations, but running at right angles to the aforesaid, are marked upon the board *a*, either at the rear, as at *v*, or at the middle, or front part of the board if preferred, for the purpose of showing the distance of the cutter *q* from the stop strip *d*. If these last named graduations are placed at the rear of the board, a pointer *w* to register with them may be attached to the end of the blade *f;* but if they are placed elsewhere on the surface of the board, they must be read from one edge of the blade *f*. The glass plate being placed on the board against the stops *c* and *d*, it will now be readily understood that the length to be cut is found by sliding the T-square guide *e—f* until the pointer *w* registers with the proper indication on the scale *v*. The cutter handle *p* is set in the position shown in Fig. 3, and, while the guide-head *e* is held firmly in place with one hand, the cutter head *j* is grasped by the other hand with the palm pressing down upon the knob *t*, thus compressing the spring *r*, and forcing the cutter *q* into contact with the glass. The squared part *s* of the cutter handle shank enters the square aperture 2 in the plug *n*, which keeps the cutter from turning, whereupon the cutter-head *j* is slid along the guide blade *f*, causing the cutter to score an accurate line across the glass. The width to be cut is found by sliding the cutter-head *j* to the proper point on the scale *u*, then the handle *p* is rotated 90 degrees to bring the cutter in position for a lengthwise cut, the cutter-head is grasped as before to depress the cutter, and the entire movable guide arrangement slid lengthwise of the board *a* with the grooved head *e* following the guide rib *g*. In the latter operation of scoring the glass lengthwise the cutter-head *j*, may, if desired, be first clamped with the screw *m* to the blade *f*, and, when a plurality of sheets are to be cut to the same size, it will be particularly convenient to clamp it. The spring *r* is intended ordinarily to keep the cutter raised above the glass, so that the shoulder of the square shank *s* normally bears up against the lug *o;* but the work may sometimes be expedited by placing said spring between the lugs *n* and *o*, as shown in Fig. 5, so that it is in compression between the upper lug *o* and the upper shoulder of the squared part *s* of the cutter handle shank, which keeps the cutter *q* down against the glass.

For use on heavy glass plates, we prefer a modified form of the movable guide blade *f* and cutter-head *j*, as illustrated in Figs. 7 to 11, whereby the blade is strengthened, and the cutter disposed centrally thereof so as to prevent its slipper binding in the guideways by avoiding side strains. In this construction the guide blade *f*, and its central rabbeted groove is made wider, and grooves may also be rabbeted out of its sides, as shown, so that the slipper *l* may have additional bearings engaging the sides of the blades. The blade is centrally slotted, as at *y*, for the cutter *q* to project through, and the cutter handle *p* is set centrally in the cutter-head *j*. Thus the overhanging lugs *n* and *o* are dispensed with, an aperture *z* being formed through the cutter-head, above which is the round hole for the shank *p*, and below which is the square hole 2 for the squared shank *s*. The cutter *q* is preferably disposed centrally of the cutter handle in this construction, as it may be also if desired in construction first described. And when it is desired to keep the cutter down upon the glass, it is obvious that the spring *r* may be placed in the aperture *z* to perform the same function as when placed between the lugs *n* and *o*.

The operation of the apparatus is substantially the same in both constructions, but the modified form, while more rigid and efficient, is somewhat more expensive to manufacture than that first described.

We further point out and distinctly claim as our invention—

1. A suitable board, a guide blade projecting laterally across said board, means for guiding said blade longitudinally of said board, a cutter-head mounted to slide lengthwise of said blade, and normally rotatable glass cutting means carried by said cutter-head and adapted to reciprocate therein without turning.

2. A suitable board, a guide blade projecting laterally across said board, means for guiding said blade longitudinally of said board, a cutter-head mounted to slide lengthwise of said blade, a normally rotatable cutter handle carried and guided by said cutter-head, and a glass cutter secured to said handle.

3. A suitable board, a guide blade projecting laterally across said board, means for guiding said blade longitudinally of said board, a cutter-head mounted to slide lengthwise of said blade, and a glass cutter provided with a handle adapted to be rotatable in said cutter-head when raised but non-rotatable when depressed.

4. A guide blade adapted to be moved and guided across a board, a cutter-head fitted to slide lengthwise of said blade, a glass cutter, and means for mounting and guiding said cutter in said cutter-head whereby said cutter may be by the hand of the operator instantly depressed, and turned about so as to cut in different directions.

5. A guide blade adapted to be moved and guided across a board, a cutter-head fitted to slide lengthwise of said blade, an aperture in said cutter-head with a round hole above it and a square hole below it, a glass cutter, and a handle secured to said cutter having a cylindrical shank fitted to said round hole and a squared part adapted to enter said square hole and be rotatable in said aperture.

6. A guide blade adapted to be moved and guided across a board, a cutter-head fitted to slide lengthwise of said blade, an aperture in said cutter-head with a round hole above it and a square hole below it, a glass cutter, a handle secured to said cutter having a cylindrical shank fitted to said round hole and a squared part adapted to enter said square hole and be rotatable in said aperture, and a spring for said handle which may be disposed either to raise or to depress said cutter.

7. A guide blade adapted to be moved and guided across a board, a cutter-head fitted to slide lengthwise of said blade, an aperture in said cutter-head with a round hole above it and a square hole below it, a glass cutter, a handle secured to said cutter having a cylindrical shank fitted to said round hole and a squared part adapted to enter said square hole and be rotatable in said aperture, a knob adjustably secured to the upper end of said handle, and a spiral spring on said handle shank between said knob and said cutter-head.

In testimony whereof we affix our signatures in the presence of two subscribing witnesses, at Cleveland, Ohio, this 1st day of February, 1913.

GEORGE W. HIGGINS.
JOSEPH UNGAR.

Witnesses:
RAYMOND B. HOPPER,
L. G. HOPPER.